United States Patent
Fan et al.

(10) Patent No.: US 9,708,431 B2
(45) Date of Patent: Jul. 18, 2017

(54) HYDROPHOBIC ALKALI SOLUBLE EMULSION THICKENER

(71) Applicants: Dow Global Technologies LLC, Midland, MI (US); Rohm and Haas Company, Philadelphia, PA (US)

(72) Inventors: Liqiang Fan, Shanghai (CN); Ling Li, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/909,149

(22) PCT Filed: Aug. 9, 2013

(86) PCT No.: PCT/CN2013/081127
§ 371 (c)(1),
(2) Date: Feb. 1, 2016

(87) PCT Pub. No.: WO2015/018047
PCT Pub. Date: Feb. 12, 2015

(65) Prior Publication Data
US 2016/0168291 A1     Jun. 16, 2016

(51) Int. Cl.
| | | |
|---|---|---|
| C08F 220/06 | (2006.01) |
| C08F 220/18 | (2006.01) |
| C08F 220/28 | (2006.01) |
| C08F 265/06 | (2006.01) |
| C08F 2/26 | (2006.01) |

(52) U.S. Cl.
CPC .............. *C08F 220/06* (2013.01); *C08F 2/26* (2013.01); *C08F 220/18* (2013.01); *C08F 220/28* (2013.01); *C08F 265/06* (2013.01)

(58) Field of Classification Search
USPC ......................................................... 524/558
See application file for complete search history.

(56) References Cited

U.S. PATENT DOCUMENTS

| | | | |
|---|---|---|---|
| 6,063,857 A | 5/2000 | Greenblatt et al. |
| 6,762,269 B1 | 7/2004 | Maxim, Jr. et al. |
| 8,232,356 B2 * | 7/2012 | Leyrer ..................... A61K 8/04 526/79 |
| 2006/0106153 A1 | 5/2006 | Blankenship et al. |
| 2006/0270563 A1 * | 11/2006 | Yang ..................... A61K 8/8152 507/119 |
| 2009/0088516 A1 | 4/2009 | Li et al. |
| 2010/0210771 A1 | 8/2010 | Leyrer et al. |
| 2010/0324177 A1 | 12/2010 | Bakeev et al. |
| 2011/0213071 A1 | 9/2011 | Suau et al. |
| 2011/0237745 A1 | 9/2011 | Bobsein et al. |

FOREIGN PATENT DOCUMENTS

| | | |
|---|---|---|
| EP | 1721915 A1 | 11/2006 |
| GB | 2496675 A | 5/2013 |

OTHER PUBLICATIONS

International Search Report for International Application No. PCT/CN2013/081127; International Filing Date Aug. 9, 2013; Date of Mailing Jul. 2, 2014; 4 pages.

* cited by examiner

*Primary Examiner* — Vu A Nguyen
(74) *Attorney, Agent, or Firm* — Karl E. Stauss; Cantor Colburn LLP

(57) ABSTRACT

The present invention provides a hydrophobic alkali soluble emulsion comprising a polymer obtainable by polymerization with the following monomer components: a) from 40 wt. % to 50 wt. %, based on the total weight of the polymer, of an $\alpha,\beta$-ethylenically unsaturated carboxylic acid monomer; b) from 40 wt. % to 50 wt. %, based on the total weight of the polymer, of an $\alpha,\beta$-ethylenically unsaturated nonionic monomer; c) from 5 wt. % to 8 wt. %, based on the total weight of the polymer, of a nonionic macromonomer; and d) from 1 wt. % to 3 wt. %, based on the total weight of the polymer, of a methyl polyglycol acrylic acid ester.

7 Claims, No Drawings

HYDROPHOBIC ALKALI SOLUBLE EMULSION THICKENER

FIELD OF THE INVENTION

This invention relates to a hydrophobic alkali soluble emulsion (HASE), especially, a methyl polyglycol acrylic acid ester modified hydrophobic alkali soluble emulsion.

INTRODUCTION

Hydrophobic alkali soluble emulsions (HASE) are a widely used rheology modifier imparting thickening properties to coatings. It is still desirable in the art to provide a new HASE composition which at a relatively low loading level provides a coating with good thickening performance as described by viscosity.

SUMMARY OF THE INVENTION

The present invention provides a HASE comprising a polymer obtainable by polymerization with the following monomer components: a) from 40 wt. % to 50 wt. %, based on the total weight of the polymer, of an α,β-ethylenically unsaturated carboxylic acid monomer; b) from 40 wt. % to 50 wt. %, based on the total weight of the polymer, of an α,β-ethylenically unsaturated nonionic monomer; c) from 5 wt. % to 8 wt. %, based on the total weight of the polymer, of a nonionic macromonomer; and d) from 1 wt. % to 3 wt. %, based on the total weight of the polymer, of a methyl polyglycol acrylic acid ester.

In one embodiment of the present invention, the nonionic macromonomer has the formula: $H_2C=C(R)CO_2(CH_2CH_2O)_n(CH(R^1)CH_2O)_mR^2$, wherein R is H or $CH_3$, $R^1$ is $C_1$-$C_2$ alkyl; $R^2$ is $C_8$-$C_{30}$ alkyl, $C_8$-$C_{16}$ alkyl phenyl or $C_{13}$-$C_{36}$ aralkyl phenyl; n is an integer from 6 to 100 and m is an integer from 0 to 50, provided that n≥m and m+n is from 6 to 100.

In another embodiment of the present invention, the methyl polyglycol acrylic acid ester has the formula: $H_2C=C(CH_3)CO_2(CH_2CH_2O)_nCH_3$, wherein n is an integer from 20 to 30.

DETAILED DESCRIPTION OF THE INVENTION

The present invention is a HASE comprising a polymer obtainable by the emulsion polymerization of the following monomers:

a) from 40 wt. % to 50 wt. %, preferably from 43 wt. % to 48 wt. %, and more preferably from 45 wt. % to 47 wt. %, based on the total weight of the polymer, an α,β-ethylenically unsaturated carboxylic acid monomer;

b) from 40 wt. % to 50 wt. %, preferably from 42 wt. % to 48 wt. %, and more preferably from 45 wt. % to 47 wt. %, based on the total weight of the polymer, an α,β-ethylenically unsaturated nonionic monomer;

c) from 5 wt. % to 8 wt. %, preferably from 5 wt. % to 7 wt. %, and more preferably from 5 wt. % to 6 wt. %, based on the total weight of the polymer, a nonionic macromonomer; and d) from 1 wt. % to 3 wt. %, preferably from 1 wt. % to 2.5 wt. %, and more preferably from 1.5 wt. % to 2.5 wt. %, based on the total weight of the polymer, a methyl polyglycol acrylic acid ester.

The α,β-ethylenically unsaturated carboxylic acid monomers are α,β-ethylenically unsaturated monomers containing at least one carboxylic acid group. Examples of the α,β-ethylenically unsaturated carboxylic acid monomers used in the present invention include monobasic acids, such as acrylic, methacrylic, crotonic, and acyloxypropionic acid; and dibasic acid monomers, such as maleic, fumaric, and itaconic acid. In some embodiments, dibasic acid monomers are used in place of a portion, e.g., up to about 10 weight percent, of the monobasic acid. Monoesters of dibasic acids, such as monobutyl ester of maleic acid can also be used. Preferably used examples are acrylic acid, methacrylic acid, and the mixture thereof.

The α,β-ethylenically unsaturated nonionic monomers are α,β-ethylenically unsaturated monomers without bearing an ionic charge between pH=1-14. Examples of the α,β-ethylenically unsaturated nonionic monomers used in the present invention include (meth)acrylic ester monomers, where the (meth)acrylic ester designates methacrylic ester or acrylic ester including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate and hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride. Preferably used examples are ethyl acrylate, methyl methacrylate, 2-hydroxybutyl acrylate, 2-hydroxyethyl methacrylate, 2-hydroxypropyl methacrylate, vinyl acetate, acrylonitrile and the mixture thereof.

In one embodiment of the present invention, the nonionic macromonomer of the present invention has the formula:

$$H_2C=C(R)CO_2(CH_2CH_2O)_n(CH(R^1)CH_2O)_mR^2,$$

wherein R is H or $CH_3$, $R^1$ is $C_1$-$C_2$ alkyl; $R^2$ is $C_8$-$C_{30}$ alkyl, $C_8$-$C_{16}$ alkyl phenyl or $C_{13}$-$C_{36}$ aralkyl phenyl; n is an integer from 6 to 100 and m is an integer from 0 to 50, provided that n≥m and m+n is from 6 to 100. Preferably, m=0, and n is an integer from 10 to 60; and most preferably, m=0, and n is an integer from 20 to 40.

Suitable examples of the nonionic macromonomer include SIPOMER™ BEM (ethoxylated behenyl methacrylate, 50% active), SIPOMER™ SEM-25 (polyalkoxyl polyarylphenol ethylenic methacrylate, 60% acitive), SIPOMER™ HPM-100 (methacrylic ester monomers, 50% active), SIPOMER™ HPM-200 (methacrylic ester monomer, 50% active), and SIPOMER™ HPM-400 (methacrylic ester monomer, 50% active) all available from Solvay Chemicals, Inc., and methacrylate ester alcohol (MACS). Preferably used examples are SIPOMER™ BEM (50% active), and SIPOMER™ HPM-400 (50% active), and methacrylate ester alcohol (MACS).

In yet another embodiment of the present invention, the methyl polyglycol acrylic acid ester of the present invention has the formula:

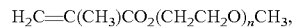
$$H_2C=C(CH_3)CO_2(CH_2CH_2O)_nCH_3,$$

wherein n is an integer from 20 to 30. Preferably n is an integer from 23 to 27. More preferably n is an integer from 25 to 27.

Suitable examples of the methyl polyglycol acrylic acid ester include HMMME-1300A, HMMME-1200A, HMMME-1100A, and HMMME-1000A all available from Zhejiang Huangma chemical industry group Co., Ltd.

The polymer of the present invention can be conveniently prepared by using the above-described monomers and by conventional emulsion polymerization techniques at an acid pH lower than about 5.0 using free-radical producing initiators, usually in an amount from 0.01 percent to 3 percent based on the total weight of the monomers. Commonly used initiators include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. Polymerization at an acid pH lower than about 5.0 permits direct preparation of an aqueous colloidal dispersion with relatively high solids content without problems of undue viscosity.

EXAMPLES

I. Raw Material

| Chemical name | Abbreviation |
| --- | --- |
| methacrylic acid | MAA |
| ethyl acrylate | EA |
| n-dodecyl mercaptan | n-DDM |
| ammonium persulfate | APS |
| tert-butylhydroperoxide | t-BHP |
| isoascorbic acid | IAA |
| sodium acetate | NaAc |
| ferrous sulfate | $FeSO_4$ |
| propylene glycol | PG |
| methacrylate ester alcohol | MACS |

| Raw materials | Company |
| --- | --- |
| HMMME-1300A | Zhejiang Huangma (Shanghai) Chemical Industry Group |
| DISPONIL ™ FES 32 emulsifier | BASF Global Corporation |
| KATHON ™ LX biocide (1.5% active) | The Dow Chemical Company |
| CELLOSIZE ™ QP-30000H thickener | The Dow Chemical Company |
| AMP ™ 95 neutralizer | The Dow Chemical Company |
| OROTAN ™ 1288 dispersant | The Dow Chemical Company |
| TRITON ™ CF-10 wetting agent | The Dow Chemical Company |
| BLACKBURST ™ CF-246 defoamer | Blackburn Chemicals Ltd. |
| DB-80 extender | Shanxi Jinyang Calcined Kaolin Ltd. (China) |
| ASP ™ 170 extender | BASF Global Corporation |
| HS-801A extender | Inner Mongolia Huasheng Co., Ltd. |
| Titanium dioxide SR-237 pigment | Shandong Doguide Group Co., Ltd. |
| CC-1000 extender | Guangfu Building Materials Group (China) |
| TEXANOL ™ Coalescent | Eastman Chemical Company |
| KATHON ™ LXE biocide | The Dow Chemical Company |
| PRIMAL ™ DC-420 binder | The Dow Chemical Company |

II. Processes

Performance Evaluation Methods i) Viscosity

Krebs Unit (KU) viscosity, representing the mid-shear viscosity of the coating composition, is measured by a Brookfield Krebs Unit Viscometer KU-2 available from Brookfield Engineering Laboratories, Inc., according to ASTM-D562.

Brookfield (Brk) 4/6 viscosity (cps), representing the low-shear viscosity of the coating composition, is measured by a Brookfield viscometer DV-II+Pro EXTRA, available from Brookfield Engineering Laboratories, Inc., at a low-shear rate under 6 rpm with a spindle 4, according to ASTM-D562.

ii) Color Acceptance

Draw down a film with a 3 mil Sheen film applicator (available from Sheen Instruments Ltd., UK) on a 1B Penopac chart (available from Leneta Company, USA) held by a vacuum plate. Two small sections, approximately 1-2 inches each in diameter are rubbed in a circular motion with clean dry finger tips for approximately 100 cycles.

Dry the charts in a constant temperature room for 24 hours. The lower the read numbers ($\Delta E$) is, the better the color acceptance is. A $\Delta E$ value above 0.45 is not acceptable. The color acceptance is measured by Sheen spectrophotometer Micromatch Plus available from Sheen Instruments Ltd., UK.

Phthalo blue is one of typical colorants added to the formulation for measuring the color acceptance ($\Delta E$).

III. Experimental Examples

Comparative Example 1 (CE1)

This example illustrates the preparation of a HASE thickener comprising polymerized monomers 47 EA/48 MAA/5 MACS in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86 L. An initiator, 1.30 g of APS dissolved in 31.00 g of water, was added. Two minutes later, the monomer emulsion, 583.74 g of EA, 578.42 g of MAA, 88.71 g of a mixture of 70% MACS, 20% MAA, and 10% water, and 32.17 g of DISPONIL™ FES 32 emulsifier and 0.94 g of n-DDM in 900.00 g of water, and an initiator, 0.56 g of APS dissolved in 115.5 g of water, were co-fed over a period of 80 minutes while the kettle temperature was maintained at 86 L. The kettle temperature was held at 86 L for ten minutes after the end of the feeds and then cooled to 60 L. A chaser system, 30.80 g of $FeSO_4$ solution (0.15%), 1.66 g of t-BHP in 19.00 g of water and 0.83 g of IAA in 27.00 g of water were then added. After holding at 60 L for 15 minutes, the same chaser system was charged again. The batch was cooled down to 40 L, and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the polymer emulsion was cooled to ambient temperature and filtered through a 325 mesh size screen. The resulting emulsion polymer had total solids of 34.95% with 2.0 g wet gel at pH 3.73.

Inventive Example 1 (IE1)

This example illustrates the preparation of a HASE thickener comprising polymerized monomers 47 EA/47 MAA/5 MACS/1 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 563.90 g of MAA, 88.71 g of a mixture of 70% MACS, 20% MAA, and 10% water, 16.85 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 35.18% with 4.0 g wet gel at pH 3.72.

Inventive Example 2 (IE2)

This example illustrates the preparation of a HASE thickener comprising polymerized monomers 47 EA/46 MAA/5 MACS/2 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 551.90 g of MAA, 88.71 g of a mixture of 70% MACS, 20% MAA, and 10% water, 33.70 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 35.59% without wet gel at pH 3.74.

Inventive Example 3 (IE3)

This example illustrates the preparation of a HASE thickener comprising polymerized monomers 47 EA/45 MAA/5 MACS/3 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 538.58 g of MAA, 88.71 g of a mixture of 70% MACS, 20% MAA, and 10% water, 50.56 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 35.74% without wet gel at pH 3.67.

Comparative Example 2 (CE2)

This example illustrates the preparation of a HASE thickener comprising polymerized monomers 47 EA/44.5 MAA/5 MACS/3.5 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 531.95 g of MAA, 88.71 g of a mixture of 70% MACS, 20% MAA, and 10% water, 59.00 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 35.48% without wet gel at pH 3.62.

Comparative Example 3 (CE3)

This example illustrates the preparation of a HASE thickener comprising polymerized monomers 47 EA/44 MAA/5 MACS/4 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 525.30 g of MAA, 88.71 g of a mixture of 70% MACS, 20% MAA, and 10% water, 67.41 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of FeSO$_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 35.38% with 3.5 g wet gel at pH 4.0.

Comparative Example 4 (CE4)

This example illustrates the preparation of a HASE thickener comprising polymerized monomers 47 EA/43 MAA/5 MACS/5 HMMME-1300A in weight ratio.

A five-liter, four-necked flask equipped with a mechanical stirrer, a nitrogen sweep, a thermocouple, and a condenser was charged with 720.00 g of water and 32.17 g of DISPONIL™ FES 32 emulsifier. The kettle solution was heated at 86° C. An initiator, 1.30 g of APS dissolved in 31.00 g of water, was added. Two minutes later, the monomer emulsion, 583.74 g of EA, 513.60 g of MAA, 88.71 g of a mixture of 70% MACS, 20% MAA, and 10% water, 84.26 g of HMMME-1300A, 0.93 g of n-DDM and 32.17 g of DISPONIL™ FES 32 emulsifier in 900.00 g of water, and an initiator, 0.56 g of APS dissolved in 115.5 g of water, were co-fed over a period of 80 minutes while the kettle temperature was maintained at 86° C. The kettle temperature was held at 86° C. for ten minutes after the end of the feeds and then cooled to 60° C. A chaser system, 30.80 g of $FeSO_4$ solution (0.15%), 1.66 g of t-BHP in 19.00 g of water and 0.83 g of IAA in 27.00 g of water were then added. After holding at 60° C. for 15 minutes, the same chaser system was charged again. The batch was cooled down to 40° C., and a buffer solution of 2.19 g of NaAc in 258.00 g of water was added over 10 minutes, then a biocide solution of 7.41 g of KATHON™ LX biocide (1.5%) in 28.00 g of water was added over 10 minutes. After completion of the polymerization, the copolymer emulsion was cooled to ambient temperature and filtered through a 325 mesh size screen. The resulting emulsion polymer had total solids of 3527% with 4.5 g wet gel at pH 3.94.

| Coating formulation: Grind | |
|---|---|
| Water | 304.76 |
| OROTAN ™ 1288 dispersant | 4.04 |
| TRITION ™ CF-10 wetting agent | 1.01 |
| BLACKBURST ™ CF-246 defoamer | 2.02 |
| CELLOSIZE ™ QP-30000H thickener | 1.52 |
| AMP ™ 95 neutralizer | 2.02 |
| TITANIUM DIOXIDE SR-237 | 40.43 |
| HS-801A extender | 50.54 |
| ASP ™ 170 extender | 80.86 |
| CC-1000 extender | 303.24 |
| Sub totals | 790.44 |
| Let down | |
| KATHON ™ LXE biocide | 1.01 |
| BLACKBURST ™ CF-246 defoamer | 1.01 |
| TEXANOL ™ Coalescent | 10.11 |
| propylene glycol | 10.11 |
| Water | 80.28 |
| AMP ™ 95 neutralizer | 0.50 |
| PRIMAL ™ DC-420 binder | 101.01 |
| HASE | 5.40 |
| Premix Sub-total | 1000.00 (77% PVC) |

IV. Results and Discussion

TABLE 1

| No. | HASE components | HASE (g) | Viscosity (KU) | Viscosity (cps) | Color acceptance (ΔE) |
|---|---|---|---|---|---|
| CE 1 | 47EA/48MAA/5MACS/ 0HMMME-1300A/ 0.075nDDM | 1.42 | 110.4 | 12697 | N/A |
| CE 2 | 47EA/44.5MAA/5MACS/ 3.5HMMME-1300A/ 0.075nDDM | 2.40 | 117.4 | 26194 | 0.28 |
| CE 3 | 47EA/44MAA/5MACS/ 4HMMME-1300A/ 0.075nDDM | 2.10 | 108.7 | 21195 | 0.47 |
| CE 4 | 47EA/43MAA/5MACS/ 5HMMME-1300A/ 0.075nDDM | 2.12 | 108.6 | 21595 | 0.48 |
| IE1 | 47EA/47MAA/5MACS/ 1HMMME-1300A/ 0.075nDDM | 1.84 | 124.3 | 27194 | 0.11 |
| IE2 | 47EA/46MAA/5MACS/ 2HMMME-1300A/ 0.075nDDM | 1.93 | 119.2 | 35093 | 0.06 |
| IE3 | 47EA/45MAA/5MACS/ 3HMMME-1300A/ 0.075nDDM | 1.93 | 121.3 | 33993 | 0.1 |

The viscosities of middle shear (KU) and low shear (Brk 4/6, cps) were recorded (24 hrs equilibrated values). Phthalo blue was used as the colorant for measuring color acceptance. KU viscosities for coatings were adjusted to a level around 110~120 KU by different HASE loading. The more the HASE was needed, the lower their thickening efficiency was.

As shown in Table 1, the addition of HMMME-1300A improved the low shear viscosity (Brk 4/6, cps) from 12697 (CE 1) to over 21000 cps (CEs 2 to 3, and IEs 1 to 3). The improvement is especially obvious when the cps viscosity of CE1 was compared to that of IE1, where HMMME-1300A loadings were similar but the cps viscosity was improved for over 125%. 1E2 to 1E3 compared to IE1 had an even more significant low shear viscosity improvement considering the HMMME-1300A loadings. In the examples that HMMME-1300A loadings were beyond 3% based on the total monomers, their low shear viscosities dropped even with increased HASE loadings (as shown in CEs 2 to 4). On the other hand, the higher the HMMME-1300A loading was (CEs 2 to 4), the higher the ΔE was, and the poorer the color acceptance was.

What is claimed is:
1. A hydrophobic alkali soluble emulsion comprising a polymer obtained by polymerizing the following monomer components:
   a) from 40 wt. % to 50 wt. %, based on the total weight of the polymer, of an α,β-ethylenically unsaturated carboxylic acid monomer;
   b) from 40 wt. % to 50 wt. %, based on the total weight of the polymer, of an α,β-ethylenically unsaturated nonionic monomer;

c) from 5 wt. % to 8 wt %, based on the total weight of the polymer, of a nonionic macromonomer having the formula:

$$H_2C=C(R)CO_2(CH_2CH_2O)_n(CH(R^1)CH_2O)_mR^2,$$

wherein R is H or $CH_3$, $R^1$ is $C_1$-$C_2$ alkyl; $R^2$ is $C_8$-$C_{30}$ alkyl, $C_8$-$C_{16}$ alkyl phenyl or $C_{13}$-$C_{36}$ aralkyl phenyl; n is an integer from 6 to 100 and m is an integer from 0 to 50, provided that n≥m and m+n is from 6 to 100; and d) from 1 wt. % to 3 wt. %, based on the total weight of the polymer, of a methyl polyglycol acrylic acid ester.

2. The hydrophobic alkali soluble emulsion according to claim 1 wherein the methyl polyglycol acrylic acid ester has the formula:

$$H_2C=C(CH_3)CO_2(CH_2CH_2O)_nCH_3,$$ wherein n is an integer from 20 to 30.

3. The hydrophobic alkali soluble emulsion according to claim 1 wherein the α,β-ethylenically unsaturated carboxylic acid monomer is selected from acrylic acid, methacrylic acid, and the mixture thereof.

4. The hydrophobic alkali soluble emulsion according to claim 1 wherein the α,β-ethylenically unsaturated nonionic monomer is selected front ethyl acrylate, methyl methacrylate, 2-hydroxybutyl acrylate, 2-hydroxyethyl methacrylate, 2-hydroxypropyl methacrylate, vinyl acetate, acrylonitrile and the mixture thereof.

5. The hydrophobic alkali soluble emulsion according to claim 1 wherein the nonionic macromonomer has the formula:

$$H_2C=C(R)CO_2(CH_2CH_2O)_n(CH(R^1)CH_2O)_mR^2,$$

wherein m=0, and n is an integer from 10 to 60.

6. The hydrophobic alkali soluble emulsion according to claim 2 wherein the methyl polyglycol acrylic acid ester has the formula:

$$H_2C=C(CH_3)CO_2(CH_2CH_2O)_nCH_3,$$

wherein n is an integer from 23 to 27.

7. The hydrophobic alkali soluble emulsion according to claim 1 wherein the methyl polyglycol acrylic acid ester is from 1.5 wt. % to 2.5 wt. % based on the total weight of the polymer.

* * * * *